(No Model.)

T. H. ALLEN.
RAILWAY BRAKE.

No. 506,298. Patented Oct. 10, 1893.

WITNESSES
H. Dixon
J Gray

INVENTOR
Thomas H. Allen
per W. J. Graham
Atty.

UNITED STATES PATENT OFFICE.

THOMAS H. ALLEN, OF TORONTO, CANADA.

RAILWAY-BRAKE.

SPECIFICATION forming part of Letters Patent No. 506,298, dated October 10, 1893.

Application filed January 11, 1893. Serial No. 458,071. (No model.)

*To all whom it may concern:*

Be it known that I, THOMAS HENRY ALLEN, of the city of Toronto, in the county of York and Province of Ontario, Canada, have invented certain new and useful Improvements in Railway-Brakes, of which the following is a specification.

My invention relates to an improved railway brake which is applied to both the wheel or wheels and the rails to act as a wedge between said wheels and rails and it consists of two parts jointed together by an adapted upper end on the rail brake which fits an adapted joint on the rear of and about the center of the wheel brake, together with means hereinafter described for maintaining the said wheel and rail brakes applied and for releasing them when necessary, from contact with the wheels and rails.

The object of my invention is to provide a brake for street and other railways that acts both on the wheels and rails and thereby stops the car or vehicle to which they are attached much more readily and effectually than brakes applied to the wheels which though often securing the wheels from turning do not prevent them sliding along the rails a considerable distance. I attain this object by the means illustrated in the accompanying drawings in which similar numbers of reference refer to similar parts throughout.

Figure 1:
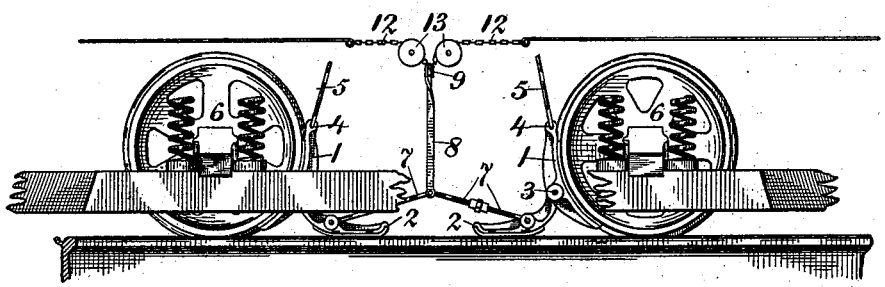
Figure 2:
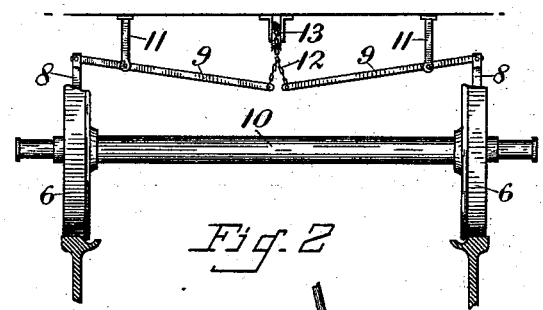
Figure 3:
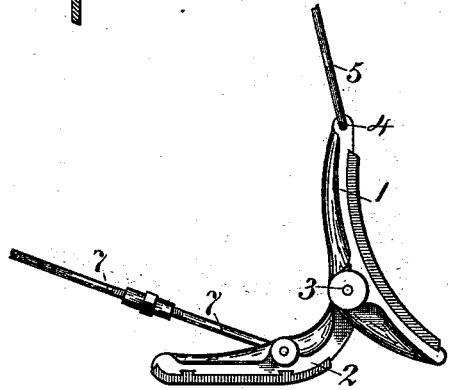

Figure 1 represents a side elevation of the wheels and a portion of the frame of a street car provided with my improved brake. Fig. 2 represents an end elevation of the same, and Fig. 3 represents a detail of the brake and the hanger supporting it and a portion of the operating bar.

My improved brake is composed of the wheel brake 1 and the rail brake 2 jointed together by means of a joint 3 formed on the rear central portion of the wheel brake 1 to which the upper end of rail brake 2 is jointed as shown. On the upper end of the wheel brake 1 is formed an eye 4 as a means by which the hanger link 5 supports it suspended from the body of the car and at a point outside of a vertical line above the brake 1, so as to cause said brake 1 to hang clear of the brake 6, normally. To the upper side of the rail brake 2 is jointed the bar 7 which at its upper end is jointed to a hanger bar 8. The bar 8 at its upper end is jointed to a lever 9 extending transverse of the car and parallel with the axles 10 of the wheels 6.

The levers 9 (of which there is one from each side) extend inward so as to bring their inner ends close to one another. Each lever 9 is fulcrumed or supported by a hanger 11 secured to the body of the car, and when necessary said levers 9 may be provided with weights to cause the brakes 1 and 2 to be suspended clear of the wheel 6 and the rails of the road. To the inner end of each of the levers 9 is attached a chain 12 which is carried over a roller wheel 13 supported also from the bottom of the car. Each chain 12 extends to the brake shaft usually located on the platforms of cars and which are not shown in the drawings.

The action of the invention is that when either or both the chains 12 are drawn taut the inner ends of the levers 9 are elevated thereby operating their outer ends downward and causing the hanger bars 8 to depress the connected ends of the bars 7 and thereby apply the wheel and rail brakes 1 and 2 respectively to the wheels 6 and the rails similarly which act as hereinbefore stated, on the principle of the wedge between the wheels and the rails, thereby retarding the revolution of the wheels and transferring a portion of their weight from direct contact with the rails to an indirect one through the rail brake 2. On the bars 7 I provide extension sleeves or turn buckles as a means by which to adjust their length and compensate for wear of the brakes 1 and 2.

Having now described my invention, what I claim, and desire to secure by Letters Patent, is—

1. In combination, the wheel brake supported by a hanger link and having a joint on the rear central portion, and the rail brake connected to said joint on the wheel brake, by its upper end, and having means on its top side by which it is connected to be operated, substantially as shown and described.

2. In a combined wheel and rail brake the combination of the combined wheel and rail brake composed of the wheel brake and the rail brake jointed together as specified the hanger supporting the wheel brake and the bars jointed to the said rail brake and connected together at their upper ends, substantially as shown and described.

3. In a combined wheel and rail brake, the combination of the brake composed of the wheel brake and the rail brake jointed together as specified the hanger links supporting the wheel brakes, the bars jointed to the top of the rail brakes and to one another at their upper ends, and the hanger bars connected to the upper ends of said bars, substantially as shown and described.

4. In a combined wheel and rail brake, the combination of the wheel and rail brakes jointed together as specified the hanger links supporting the wheel brakes the bars jointed by their lower ends to said rail brakes and connected together at their upper ends the hanger bars connected to the upper ends of said bars, and the levers connected to and supporting said hanger bars and supported by their fulcrums on the car body, substantially as shown and described.

5. In a combined wheel and rail brake the combination of the wheel and rail brakes jointed together as specified the hanger links supporting said wheel brake to the car body the bars jointed to the top of said rail brake and connected together at their opposite ends, the hanger bars connecting the upper ends of said bars to the transverse levers, the said transverse levers supported by the car body, the chains connected to said transverse levers and to the brake rails at the ends of the car, and the rollers supported by the car body and over which the chains are carried substantially as shown and described.

THOMAS H. ALLEN.

Witnesses:
ALEX. BRYCE,
JOHN GRAY.